(12) United States Patent
Yoshikawa et al.

(10) Patent No.: US 7,787,184 B2
(45) Date of Patent: Aug. 31, 2010

(54) MEMBER HAVING ANTIREFLECTION STRUCTURE (75) Inventors: Motonobu Yoshikawa, Osaka (JP); Keiki Yoshitsugu, Osaka (JP); Hiroaki Okayama, Osaka (JP); Yoshiharu Yamamoto, Toyonaka (JP); Kazutake Boku, Hirakata (JP)

(73) Assignee: Panasonic Corporation, Osaka (JP)

( * ) Notice: Subject to any disclaimer, the term of this patent is extended or adjusted under 35 U.S.C. 154(b) by 509 days.

(21) Appl. No.: 11/370,144

(22) Filed: Mar. 8, 2006

(65) Prior Publication Data

US 2006/0227834 A1 Oct. 12, 2006

(30) Foreign Application Priority Data

Mar. 8, 2005 (JP) ............................. 2005-063786

(51) Int. Cl.
*G02B 27/42* (2006.01)
(52) U.S. Cl. ....................................... 359/577; 359/566
(58) Field of Classification Search ................. 359/601, 359/577, 566
See application file for complete search history.

(56) References Cited

U.S. PATENT DOCUMENTS

| 4,148,550 | A | * | 4/1979 | MacAnally ................. 359/435 |
| 4,322,125 | A | | 3/1982 | Warren |
| 5,353,070 | A | | 10/1994 | Mitani et al. |
| 6,175,442 | B1 | | 1/2001 | Booth, Jr. et al. |
| 6,514,674 | B1 | | 2/2003 | Iwasaki |
| 2002/0008461 | A1 | | 1/2002 | Raj et al. |
| 2003/0180476 | A1 | | 9/2003 | Yamashita et al. |
| 2004/0004779 | A1 | * | 1/2004 | Kochergin et al. .......... 359/885 |
| 2004/0032667 | A1 | | 2/2004 | Gale et al. |
| 2005/0093210 | A1 | | 5/2005 | Umetani et al. |

FOREIGN PATENT DOCUMENTS

| EP | 0 766 102 A1 | 4/1997 |
| JP | 2000-258607 | 9/2000 |
| JP | 2001-66693 | 3/2001 |
| JP | 2001-127852 | 5/2001 |
| JP | 2003-266580 | 9/2003 |
| JP | 2004-12856 | 1/2004 |
| WO | WO 95/23710 | 9/1995 |

OTHER PUBLICATIONS

Kanamori, Y., et al. "Broadband antireflection gratings fabricated upon silicon substrates" Oct. 1999, vol. 24, No. 20, pp. 1422-1424.

* cited by examiner

*Primary Examiner*—Joshua L Pritchett
(74) *Attorney, Agent, or Firm*—McDermott Will & Emery LLP (57) ABSTRACT A reflection of unnecessary light, which should be prevented, can be suppressed, and occurrence of stray light can be reduced using a member having an antireflection structure, comprising a plate-like portion 2, and an aperture portion 3 formed in the plate-like portion 2, wherein the antireflection structure having an aspect ratio of 1 or more and comprising structural elements arranged in an array form at a period smaller than the shortest wavelength of light, the reflection of which should be prevented, is formed on an inner wall 4 of the aperture portion 3.

8 Claims, 5 Drawing Sheets

MEMBER HAVING ANTIREFLECTION STRUCTURE

CROSS-REFERENCE TO RELATED APPLICATION

This application is based on application No. 2005-63786 filed in Japan on Mar. 8, 2005, the content of which is hereby incorporated by reference.

BACKGROUND

1. Technical Field

The present invention relates to a member having an antireflection structure. More particularly, the present invention relates to a member having an antireflection structure capable of improving the image characteristics of optical apparatuses, for example.

2. Description of the Background Art

Figure 5:
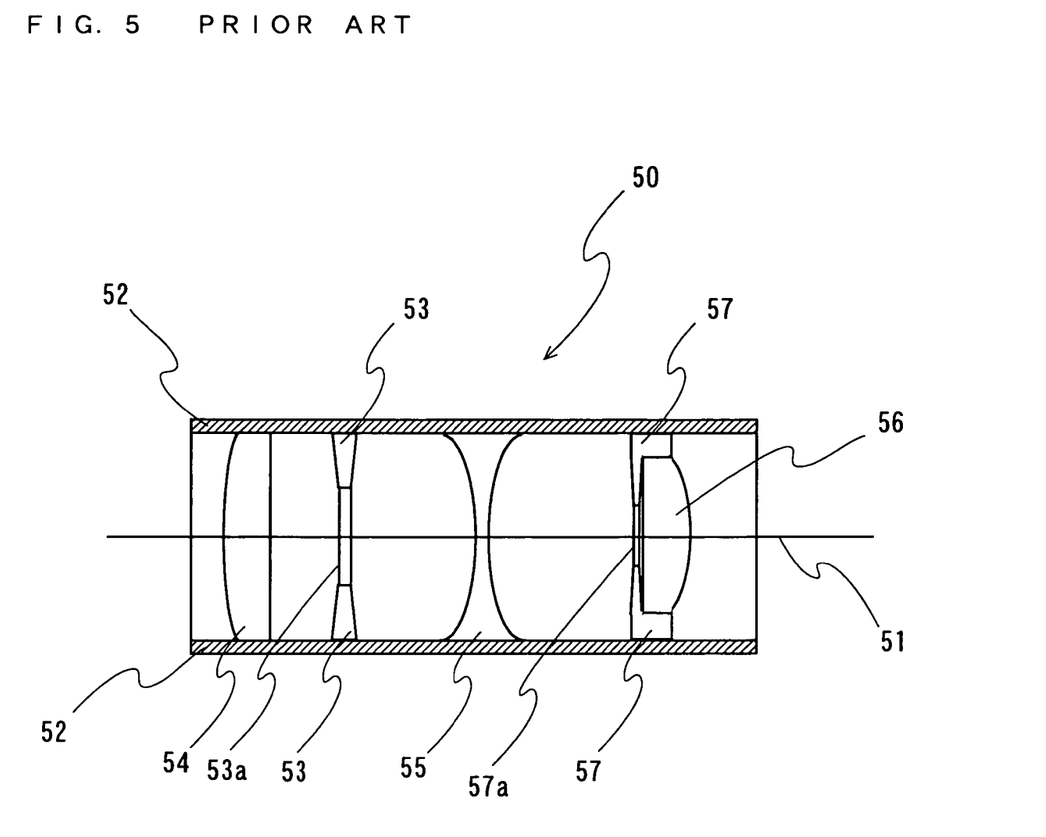
FIG. 5 is a schematic cross-sectional view showing the configuration of a general imaging optical device.

Most of optical elements and optical components being used for various uses are requested to have an antireflection function to prevent the reflection of light. FIG. 5 is a schematic cross-sectional view showing the configuration of an imaging optical device being used generally and also showing the cross-sectional structure of an imaging optical device 50 along a plane including an optical axis 51. In FIG. 5, an aperture diaphragm 53, a lens element 54, a lens element 55 and a lens element 56 on which a lens-holding member 57 is mounted, these being disposed coaxially along the optical axis 51, are provided inside a lens barrel 52 constituting the imaging optical device 50.

In the imaging optical device 50 configured as described above, if unnecessary light is reflected, the reflected light of this unnecessary light may become stray light occasionally. The stray light causes ghost and flare, thereby degrading image quality. Hence, unnecessary light, such as luminous flux entering from the lens element 54 and having an angle being equal to or more than the comprehensive angle of view thereof and stray light caused by the reflection at the surfaces of the lens elements 54, 55 and 56, is guided to an aperture portion 53a formed in the aperture diaphragm 53 or to an aperture portion 57a formed in the lens-holding member 57, whereby the reflection of the unnecessary light is prevented. Furthermore, in recent years, for the purpose of further preventing the reflection of the unnecessary light, antireflection treatment is performed to form an antireflection film, such as a single-layer film comprising a layer having a low refractive index or a multi-layer film comprising layers having a low refractive index and layers having a high refractive index, these layers being laminated, on optically functioning faces of optical components, such as the lens elements 54, 55 and 56, the lens barrel 52, and the aperture diaphragm 53, by carrying out evaporation, sputtering, coating or the like (for example, refer to Japanese Laid-Open Patent Publication No. 2001-127852).

This kind of antireflection film has been widely used because it can be formed using a general method, such as evaporation or sputtering. However, such a method requires complicated processes to accurately control the optical film thickness of the antireflection film, thereby being desired to be improved in productivity and cost. In addition, because the antireflection film has wavelength dependence, its antireflection effect at non-predetermined wavelengths becomes small. In particular, it is very difficult to attain excellent antireflection at the entire range of visible light, required in imaging optical devices. Furthermore, the antireflection film also has incident angle dependence in which the antireflection effect becomes smaller as the incident angle becomes larger. For these reasons, an antireflection treatment method capable of improving the wavelength dependence and the incident angle dependence is desired to be developed.

As a method of solving the problem regarding the wavelength dependence and the incident angle dependence, there is attracting attention for a technology of forming a structure in which structural elements having a minute concavoconvex shape are arranged at a submicron period, for example, referred to as an antireflection structure, on the optically functioning face of an optical element or an optical component, in recent years.

When this kind of antireflection structure is formed on the optically functioning face of the optical element or the optical component, the distribution of the refractive index on the optically functioning face becomes to change smoothly. Hence, almost all of incident light having wavelengths being equal to or more than the period at which the structural elements having a concavoconvex shape are arranged enter the inside of the optical element or the optical component. Therefore, the reflection of light on the optically functioning face can be prevented. Furthermore, in the case that the antireflection structure is formed on the optically functioning face, the antireflection effect does not become much smaller even if the incident angle of the incident light becomes larger. Therefore, it is possible to solve the problem regarding the wavelength dependence and the incident angle dependence of the antireflection film by forming the antireflection structure on the optically functioning face of the optical element or the optical component.

In the imaging optical device 50 configured as described above, although the antireflection structure is formed on the optically functioning faces of various kinds of members thereof, the antireflection structure is not formed on an inner wall of the aperture portion 53a in the aperture diaphragm 53 and an inner wall of the aperture portion 57a in the lens-holding member 57. This is based on the following reason: because plate-like portions of the aperture diaphragm 53 and the lens-holding member 57, in which the aperture portion 53a and the aperture portion 57a are formed, respectively, are very thin, approximately 1 mm or less, the reflection of light on the inner walls of the aperture portions 53a and 57a is ignored in the optical design of the device.

No serious problems have been caused in conventional imaging optical devices, even though they are configured on the basis of the above optical design. However, in recent years, as imaging optical devices become more compact, the refractive index of the incident light at the inner walls of the aperture portions in the aperture diaphragm and the lens-holding member changes abnormal, and the distribution of the refractive index at the optically functioning face does not change smoothly. As a result, unnecessary light is reflected slightly, and ghost and flare occur, thereby causing a problem of degrading image characteristics.

SUMMARY

The present invention is intended to provide a member capable of preventing the reflection of unnecessary light even at the inner wall of the aperture portion formed in a plate-like portion and suppressing the occurrence of stray light, and also capable of sufficiently preventing ghost and flare even when the member is applied to a compact imaging optical device.

The novel concepts disclosed herein were achieved in order to solve the foregoing problems in the conventional art, and herein is disclosed a member having an antireflection structure, comprising:

a plate-like portion; and an aperture portion formed in the plate-like portion, wherein the antireflection structure having an aspect ratio of 1 or more and comprising structural elements arranged in an array form at a period smaller than the shortest wavelength of light, the reflection of which should be prevented, is formed on an inner wall of the aperture portion.

The present invention can provide a member capable of preventing the reflection of unnecessary light and sufficiently suppressing the occurrence of stray light even in a compact optical apparatus, and suited as a component member or the like for holding an optical element disposed in an optical path. Furthermore, ghost and flare can be suppressed sufficiently by applying the member to optical apparatuses, more particularly, to imaging optical devices. Hence, it is possible to realize imaging optical devices being excellent in image characteristics.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

A member having an antireflection structure in accordance with an embodiment of the present invention will be described below. The member having the antireflection structure is applicable as a component member in various kinds of optical apparatuses, for example. An aperture of a camera lens is herein taken as an example and described below.

Figure 1:
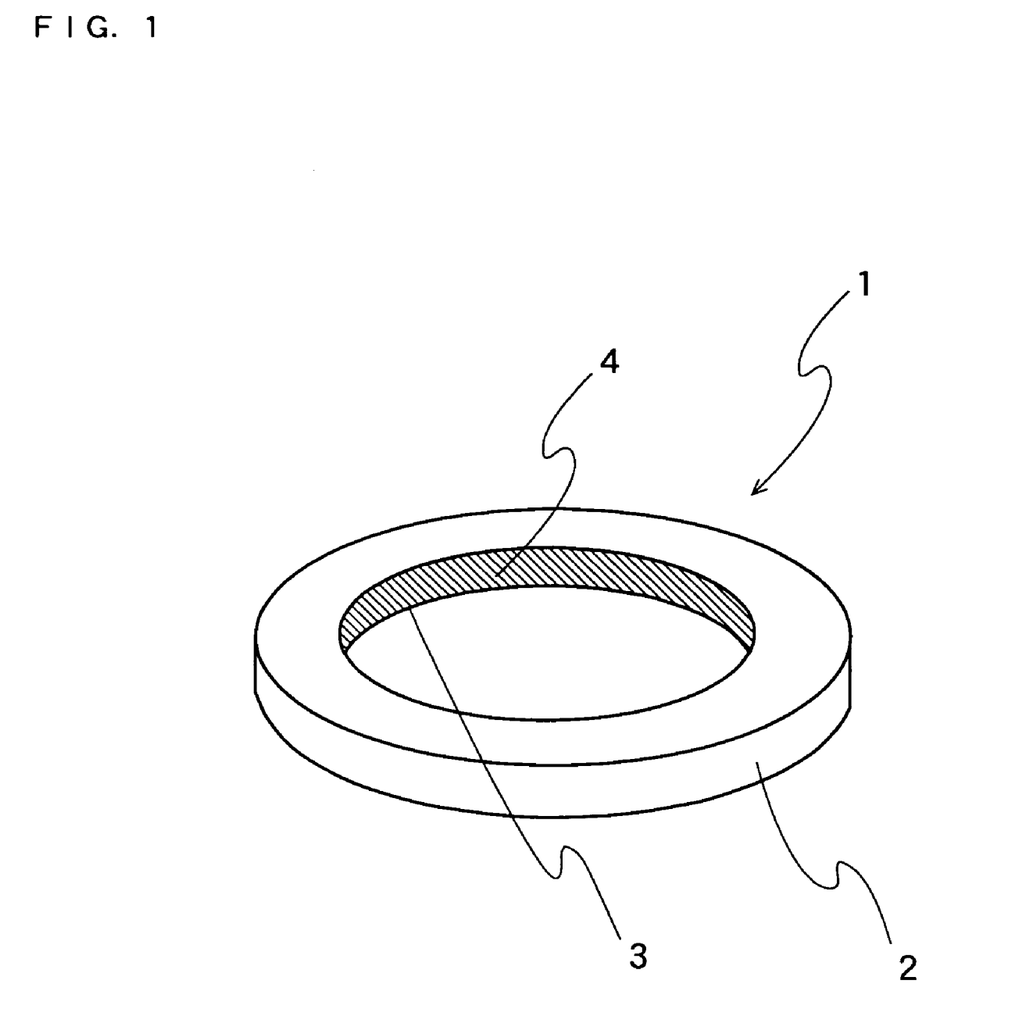
FIG. 1 is a schematic perspective view showing the configuration of an aperture in accordance with an embodiment.

FIG. 1 is a schematic perspective view showing the configuration of the aperture of a camera lens. In FIG. 1, the aperture 1 comprises a plate-like portion 2 having a thickness, and an aperture portion 3 formed in the plate-like portion 2.

In the present embodiment, it is preferable that the width of an inner wall 4 (the shaded area in FIG. 1) of the aperture portion 3 is 0.03 mm or more and 1 mm or less. The width of the inner wall 4 of the aperture portion 3 is also defined as the thickness of the plate-like portion 2. If the width of the inner wall 4 is less than 0.03 mm, it is difficult to form the aperture portion 3 in the plate-like portion 2. In addition, if the width of the inner wall 4 is more than 1 mm, stray light is apt to occur slightly in some occasions. For this reason, in the present embodiment, it is preferable that the width of the inner wall 4 of the aperture portion 3 is 0.05 mm or more, more particularly 0.1 mm or more, and it is also preferable that the width is 0.7 mm or less, more particularly 0.4 mm or less.

The antireflection structure is formed on an upper face, a lower face and an outer wall of the plate-like portion 2 (these are hereafter generally referred to as "outer surface"), just as in the case of the general conventional example. However, in the present embodiment, the antireflection structure is formed on not only the outer surface of the plate-like portion 2 but also the inner wall 4 of the aperture portion 3. The aperture 1 on which the antireflection structure is formed as described above can allow light, the reflection of which should be prevented, to enter the inside of the inner wall 4 of the aperture portion 3, thereby being capable of sufficiently suppressing the reflection of the light, the reflection of which should be prevented. Hence, even when the aperture 1 is applied to a compact camera, the occurrence of stray light can be prevented.

The antireflection structure in accordance with the present embodiment is a structure in which structural elements are arranged in an array form at a period (for example, designated by "p" in FIG. 2A described below) smaller than the shortest wavelength of the light, the reflection of which should be prevented, and the aspect ratio defined as the ratio between the period and the height (for example, designated by "h" in FIG. 2A described below) of the structural element is 1 or more. Because this kind of antireflection structure is formed on the inner wall 4 of the aperture portion 3, it is possible to prevent the reflection of the light at the inner wall 4, and it is possible to suppress the occurrence of ghost and flare due to stray light. In the present embodiment, it is preferable that the aspect ratio of the antireflection structure is 2 or more, more particularly 3 or more. The antireflection effect can be raised further using the antireflection structure having the aspect ratio described above.

When the antireflection structure is a structure in which multiple structural elements are arranged two-dimensionally, the period described above is defined as a period in the direction of the closest arrangement.

The antireflection structure is a structure for preventing the reflection of the light, the reflection of which should be prevented, that is, unnecessary light, as a matter of course. The present embodiment includes not only a structure that completely prevents the reflection of the light, the reflection of which should be prevented, but also a structure that reduces the reflection of light to the extent that the occurrence of ghost and flare due to stray light is suppressed sufficiently.

Figure 2A:
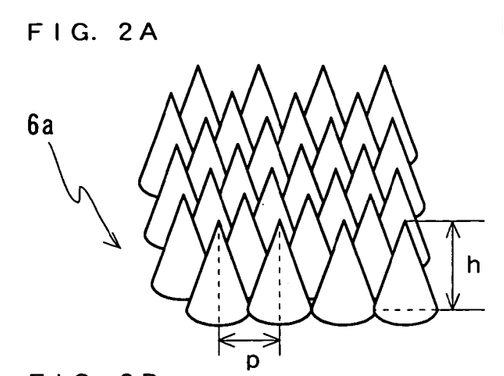
FIG. 2A is a schematic perspective view showing the configuration of an antireflection structure comprising structural elements having the shape of a cone in accordance with the embodiment.
Figure 2B:
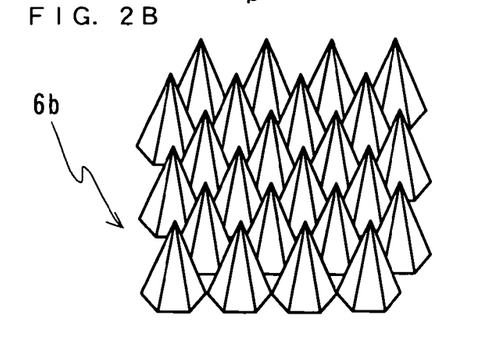
FIG. 2B is a schematic perspective view showing the configuration of an antireflection structure comprising structural elements having the shape of a pyramid in accordance with the embodiment.
Figure 2C:
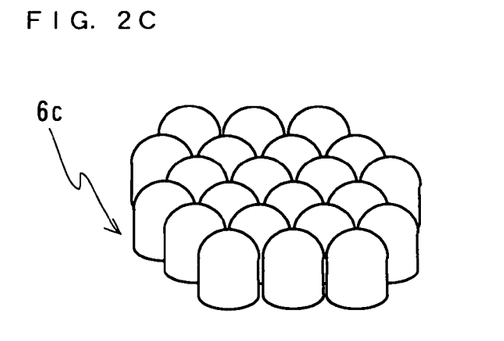
FIG. 2C is a schematic perspective view showing the configuration of an antireflection structure comprising structural elements having the shape of a bell in accordance with the embodiment.
Figure 2D:
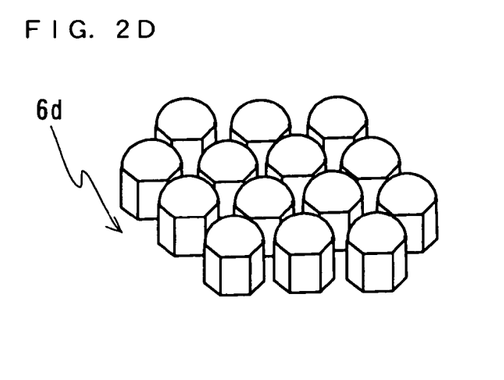
FIG. 2D is a schematic perspective view showing the configuration of an antireflection structure comprising structural elements having the shape of another bell in accordance with the embodiment.
Figure 2E:
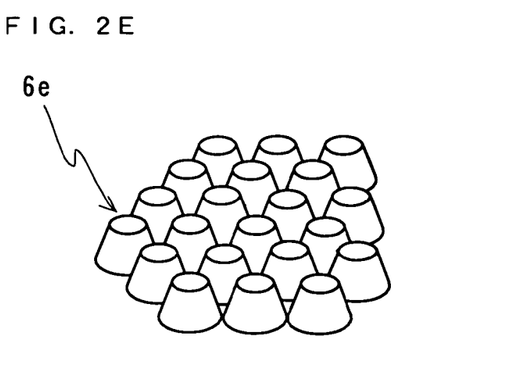
FIG. 2E is a schematic perspective view showing the configuration of an antireflection structure comprising structural elements having the shape of a truncated cone in accordance with the embodiment.
Figure 2F:
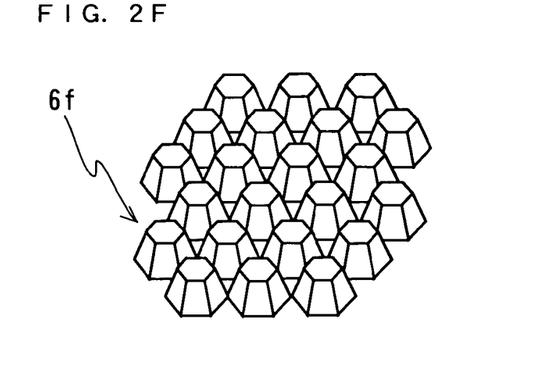
FIG. 2F is a schematic perspective view showing the configuration of an antireflection structure comprising structural elements having the shape of a truncated pyramid in accordance with the embodiment.

There are taken as examples of the antireflection structure an antireflection structure 6a comprising structural elements having the shape of a cone shown in FIG. 2A, an antireflection structure 6b comprising structural elements having the shape of a pyramid shown in FIG. 2B, antireflection structures 6c and 6d comprising structural elements having the shapes of bells shown in FIGS. 2C and 2D, an antireflection structure 6e comprising structural elements having the shape of a truncated cone, the tip of which is flattened, shown in FIG. 2E, and an antireflection structure 6f comprising structural elements having the shape of a truncated pyramid, the tip of which is flattened, shown in FIG. 2F. Among these, the antireflection structure comprising structural elements having the shape of a cone or a pyramid is preferable because the structure is particularly excellent in antireflection effect. The structural element is not required to have a strictly geometrical shape of a cone, a pyramid, a bell, a truncated cone or a truncated pyramid. The structural element should only substantially have the shape of a cone, a pyramid, a bell, a truncated cone or a truncated pyramid.

Furthermore, although the antireflection structures comprising structural elements having a protruding shape are shown in FIGS. 2A to 2F, the structural elements are not limited to have such protruding shape in the present embodiment. For example, it is possible to use an antireflection structure comprising structural elements having a recessed shape of a cone, a pyramid, a bell, a truncated cone or a truncated pyramid, arranged in an array form on a flat face at a period smaller than the shortest wavelength of the light, the reflection of which should be prevented. Furthermore, it may also be possible that the structural elements having a protruding shape and the structural elements having a recessed shape are present simultaneously in one antireflection structure. In the antireflection structure in which the structural elements having a protruding shape and the structural elements having a recessed shape are present simultaneously, the sum total of the height of a protruding portion and the depth of a recessed portion is assumed to be the height of the structural element.

The method of forming the antireflection structure on the outer surface of the aperture 1 and the inner wall 4 of the aperture portion 3 is not limited in particular. For example, there can be used, independently or in combination, a method of directly forming the antireflection structure by X-ray lithography, a method of forming the antireflection structure by electron beam lithography (hereafter referred to as "EB lithography"), and a molding-processing method using a mold having a shape opposite to the shape of a desired antireflection structure. Furthermore, it is possible to use a mold made of a glass material, a mold formed by electroforming, a metal mold, and the like, as the mold.

An example of a method capable of producing a member having an antireflection structure at low cost in large quantity, will be described below. First, a desired pattern is drawn on a substrate, such as a silica glass substrate, by the EB lithography or the like, and the substrate is subjected to processing treatment, such as dry etching, whereby there is made beforehand a high-precision master mold precisely machined so as to have the same shape as that of the antireflection structure. Next, a heated and softened glass material is subjected to press using the master mold obtained, and there is made a mold having a shape opposite to that of the desired antireflection structure. Then, a material made from a black material, such as a black resin, is subjected to press using the mold. As a result, the material is formed to have an antireflection structure having the desired shape.

In addition, in the case that a member on which such an antireflection structure is formed is a member made from a thermoplastic resin, the method described below is effective. First, a mold having a shape opposite to that of the desired antireflection structure is made of a metal, such as aluminum or brass, using an appropriate combination of etching, X-ray lithography, photolithography, and the like. Next, the mold is heated and pressed against the member made from the thermoplastic resin, whereby an antireflection structure can be formed on the member.

Furthermore, as a method of forming such an antireflection structure on the outer surface of the aperture 1 and the inner wall 4 of the aperture portion 3, a method of bonding the antireflection structure formed on a sheet member having flexibility to the outer surface and the inner wall 4 is also available in addition to the above methods. In the case that the sheet member on which the antireflection structure is formed is made from a thermoplastic resin colored in black using pigment, dye or the like, such a sheet member is further preferable because the sheet member acts as a light-absorbing member. Moreover, in the case that the antireflection structure itself is made from a black material, the antireflection structure acts as a light-absorbing member similarly as described above, even if the sheet member is transparent.

In the description using FIG. 1, the aperture 1 of the camera lens, in which the circular aperture portion 3 is formed in the circular plate-like portion 2, is taken as an example of the component member of an optical apparatus. However, the shape of the plate-like portion 2 constituting the member having the antireflection structure is not limited to a circle but may be a rectangle, a polygon, or the like. In addition, the shape of the aperture portion 3 is not limited to a circle but may be an ellipse, a rectangle, or the like. Furthermore, the aperture portion 3 is formed perpendicularly to the plate-like portion 2, and also formed so that the thickness of the plate-like portion 2 is equal to the width of the inner wall 4 of the aperture portion 3. However, the aperture portion 3 may be formed so as to tilt with respect to the plate-like portion 2. As described above, the member having the antireflection structure in accordance with the present embodiment should only be equipped with at least the plate-like portion 2 and the aperture portion 3 formed in the plate-like portion 2. For example, a cylindrical member in which a side wall is formed on the plate-like portion 2 and a member in which a conical or disc-like side wall is formed on the plate-like portion 2 are also applicable.

As specific examples of the member having the antireflection structure in accordance with the present embodiment, in addition to the above aperture, there are taken a light-shielding member configured to shield at least part of luminous flux, an aperture diaphragm configured to adjust the F-number serving as an indicator of the brightness of an optical system, a lens-holding member being used so as to be mounted on a lens element, a stray light-preventing member disposed to prevent stray light in an imaging optical system, and a flare stop for stopping the flare of off-axial luminous flux in an imaging optical system. These can be used preferably as component members constituting optical apparatuses, more particularly imaging optical devices.

As described above, in the present embodiment, because the antireflection structure is formed on the inner wall of the aperture portion formed in each of the plate-like portions of the various kinds of members described above, high antireflection effect is obtained. Hence, the reflection of the light, the reflection of which should be prevented, can be suppressed sufficiently, and the occurrence of stray light can be prevented even in downsized optical apparatuses. Therefore, the member having the antireflection structure in accordance with the present embodiment can be used preferably as a component member or the like for holding an optical element disposed in an optical path in various kinds of optical apparatuses. In addition, ghost and flare are sufficiently suppressed by applying the member having the antireflection structure to optical apparatuses, more particularly to imaging optical devices. Hence, it is possible to realize imaging optical devices being excellent in image characteristics.

Furthermore, in the case that the member having the antireflection structure in accordance with the present embodiment is requested to have high light-shielding performance and light-absorbing performance, it is preferable that the member is made from a black material. Because the member made from a black material can absorb unnecessary light, the member can sufficiently suppress the occurrence of the unnecessary light, and can further prevent the occurrence of stray light. As the black material, it is possible to preferably use a dye obtained by mixing cyan, magenta, yellow and other coloring matters in a resin, such as polycarbonate resin or acrylic resin, or a material obtained by mixing a pigment, such as carbon black, in such a resin.

Figure 3:
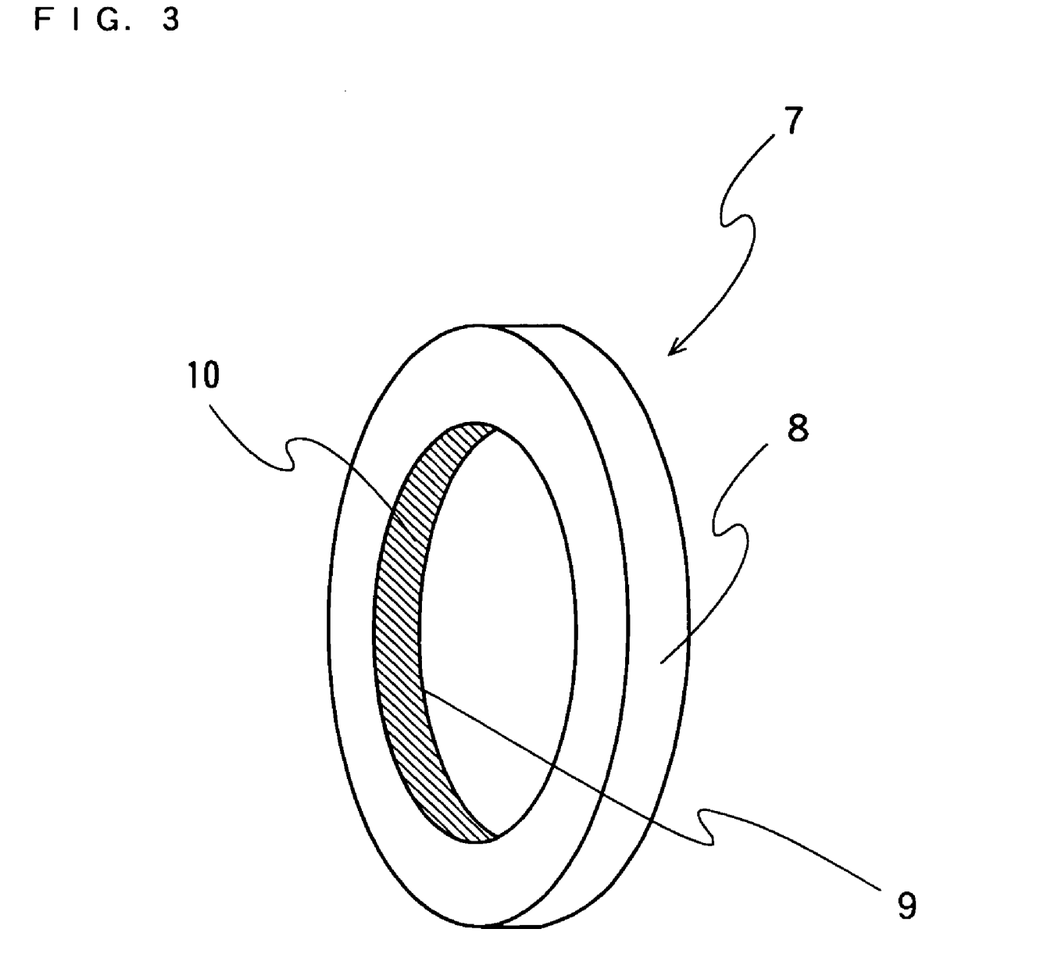
FIG. 3 is a schematic perspective view showing the configuration of an aperture diaphragm in accordance with the embodiment.

The present embodiment will be described further on the basis of specific examples. FIG. 3 is a schematic perspective view showing the configuration of an aperture diaphragm in accordance with the present embodiment. In FIG. 3, an aperture diaphragm 7 comprises a plate-like portion 8, and a circular aperture portion 9 formed in the plate-like portion 8 so as to have a desired F-number. The diameter of the circular aperture portion 9 is 3 mm, and the width of an inner wall 10 (the shaded area in FIG. 3) of the circular aperture portion 9 is 0.25 mm. The plate-like portion 8 having a ring shape and constituting the aperture diaphragm 7 is made from a black material. As the black material, a material obtained by mixing a black dye (trade name: Plast Black 8950 produced by Arimoto Chemical Co., Ltd.) in polycarbonate resin is used.

Furthermore, an antireflection structure in which structural elements having the shape of a cone having a height of 150 nm are arranged in an array form at a period of 150 nm is formed on the outer surface of the plate-like portion 8 and the inner wall 10 of the circular aperture portion 9. When visible light is used as incident light, this antireflection structure corresponds to an antireflection structure in which structural elements are arranged in an array form at the period smaller than the wavelength range (400 nm to 700 nm) of the visible light, the height of the structural elements being equal to or more than the period. Because the inner wall 10 of the circular aperture portion 9 is provided with antireflection function and light-absorbing function, the inner wall 10 significantly reduces stray light that occurs when unnecessary light is reflected.

Figure 4:
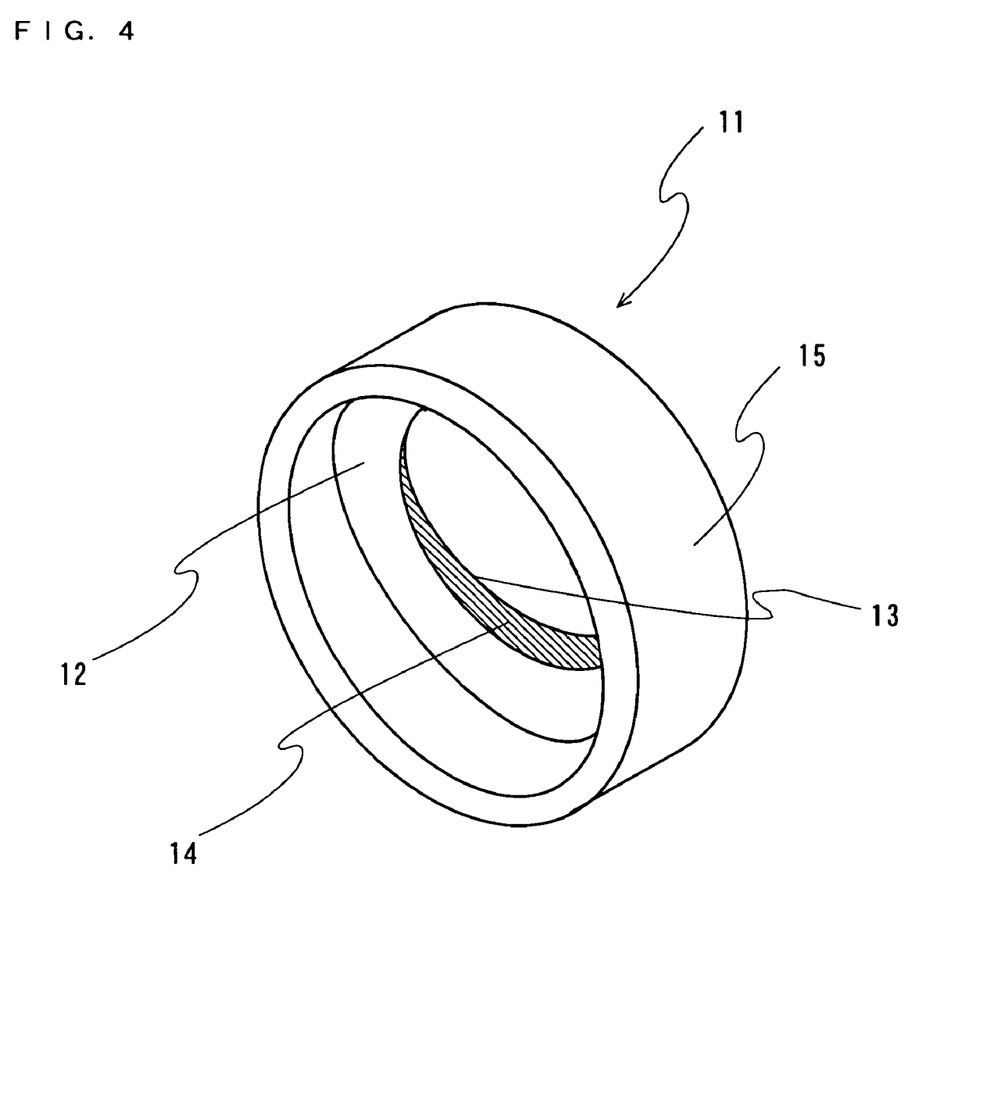
FIG. 4 is a schematic perspective view showing the configuration of a lens-holding member in accordance with the embodiment.

FIG. 4 is a schematic perspective view showing the configuration of a lens-holding member in accordance with the present embodiment. In FIG. 4, a lens-holding member 11 comprises a plate-like portion 12, a circular aperture portion 13 formed in the plate-like portion 12, and a side wall portion 15 formed around the outer circumference of the plate-like portion 12. The circular aperture portion 13 is an aperture portion for shielding only luminous flux that causes the occurrence of stray light, to the extent that luminous flux required for imaging is not shielded. The diameter of the circular aperture portion 13 is 2 mm, and the width of an inner wall 14 (the shaded area in FIG. 4) of the circular aperture portion 13 is 0.25 mm. Furthermore, the lens-holding member 11 is made from a black material similar to that of the aperture diaphragm 7 described above.

An antireflection structure in which structural elements having the shape of a cone having a height of 150 nm are arranged in an array form at a period of 150 nm is formed on the outer surface of the plate-like portion 12, the inner face and the outer face of the side wall portion 15, and the inner wall 14 of the circular aperture portion 13. When visible light is used as incident light, this antireflection structure corresponds to an antireflection structure in which structural elements are arranged in an array form at the period smaller than the wavelength range (400 nm to 700 nm) of the visible light, the height of the structural elements being equal to or more than the period. Because the inner wall 14 of the circular aperture portion 13 is provided with antireflection function and light-absorbing function, the inner wall 14 significantly reduces stray light that occurs when unnecessary light is reflected.

When the aperture diaphragm 7 and the lens-holding member 11 described above were used instead of the aperture diaphragm 53 and the lens-holding member 57, respectively, and installed in the imaging optical device 50 shown in FIG. 5, luminous flux entering from the lens element 54 and having an angle being equal to or more than the comprehensive angle of view thereof and stray light caused by the reflection at the surfaces of the lens elements 54, 55 and 56 were absorbed efficiently in the antireflection structure formed on the inner wall 10 of the aperture diaphragm 7 and the inner wall 14 of the lens-holding member 11. Hence, significant degradation in image quality, such as ghost and flare, was not recognized. Therefore, it was able to realize an imaging optical device being excellent in contrast.

In the description described above, a black material obtained by mixing a black dye in a thermoplastic resin is taken as an example of the material for the aperture diaphragm 7 and the lens-holding member 11. However, even if a black material obtained by mixing carbon black or the like in a thermoplastic resin is used instead of the former black material, a similar effect is obtained.

Furthermore, in the above description, on the assumption that visible light is used as incident light, the structural elements are arranged at the above period, and the antireflection structure comprising the structural elements is formed on the inner wall 10 of the aperture diaphragm 7 and the inner wall 14 of the lens-holding member 11. However, the period at which the structural elements are arranged can also be set on the assumption that ultraviolet light (wavelength range: 150 nm to 400 nm), near-infrared light (wavelength range: 700 nm to 2 μm), and far-infrared light (wavelength range: 2 μm to 13 μm), in addition to visible light, are used as incident light. In this case, the period at which the structural elements are arranged is set to a period smaller than the shortest wavelength of each type of light. Moreover, even in this case, it is preferable that the aspect ratio of the antireflection structure is 1 or more, particularly 2 or more, more particularly 3 or more.

The member having the antireflection structure in accordance with the present invention is widely applicable to component members having aperture portions requiring antireflection function for light in an optical path and being used for various kinds of optical apparatuses, more particularly imaging optical devices, such as digital cameras and printers.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A member having an antireflection structure, comprising:
   a plate-like portion; and
   only one aperture portion formed in said plate-like portion, wherein:
   said antireflection structure having an aspect ratio of 1 or more and comprising a plurality of structural elements two-dimensionally arranged in an array form at a period smaller than the shortest wavelength of light, the reflection of which should be prevented, is formed on an inner wall of said aperture portion, the width of said inner wall is 0.03 to 1 mm, and wherein said aperture portion is an aperture part in a component member of an optical apparatus, the width of said inner wall being measured along a direction of an optical axis of incident light into the member, and wavelength characteristics of the incident light into the member are the same as wavelength characteristics of output light from the member.

2. The member having an antireflection structure in accordance with claim 1, wherein said aperture portion is circular.

3. The member having an antireflection structure in accordance with claim 2, wherein diameter of said aperture portion is 2 to 3 mm.

4. The member having an antireflection structure in accordance with claim 1, wherein said structural elements have the shape of a cone or a pyramid.

5. The member having an antireflection structure in accordance with claim 1, wherein said plate-like portion is made from a black material.

6. The member having an antireflection structure in accordance with claim 5, wherein said black material is a material colored with a dye or a pigment.

7. The member having an antireflection structure in accordance with claim 1, wherein said optical apparatus is an imaging optical device, and said component member is at least one of an aperture, a light-shielding member, an aperture diaphragm, a lens-holding member, a stray light-preventing member, and a flare stop.

8. A member having an antireflection structure, comprising:

a ring member having an upper face and a lower face opposite to the upper face, each of the upper face and lower face having a ring shape which has an inner diameter and an outer diameter, the ring shape constituting only one aperture portion formed in the member, wherein:

said antireflection structure has an aspect ratio of 1 or more and comprises a plurality of structural elements two-dimensionally arranged in an array form at a period smaller than the shortest wavelength of light, and is formed on an inner wall of said aperture portion so as to suppress the reflection of the shortest wavelength of light, a width of said inner wall measured along a direction perpendicular to the upper and lower faces is 0.03 to 1 mm, said aperture portion is an aperture part in a component member of an optical apparatus, and wavelength characteristics of incident light into the member are the same as wavelength characteristics of output light from the member.

* * * * *